(12) United States Patent
Shaklik et al.

(10) Patent No.: US 6,502,856 B1
(45) Date of Patent: Jan. 7, 2003

(54) ROLLOVER AIR BAG SYSTEM

(75) Inventors: Brian M. Shaklik, Leo, IN (US); Ronald A. Vallette, Lakeland, FL (US); Gary L. Vandermolen, Fort Wayne, IN (US)

(73) Assignee: International Truck Intellectual Property Company, L.L.C., Warrenville, IL (US)

( * ) Notice: Subject to any disclaimer, the term of this patent is extended or adjusted under 35 U.S.C. 154(b) by 0 days.

(21) Appl. No.: 09/503,101

(22) Filed: Feb. 11, 2000

(Under 37 CFR 1.47)

(51) Int. Cl.$^7$ .................................. B60R 21/32
(52) U.S. Cl. .................. 280/735; 280/737; 280/741
(58) Field of Search ................. 280/735, 741, 280/737

(56) References Cited

U.S. PATENT DOCUMENTS

| | | | | |
|---|---|---|---|---|
| 4,258,931 A | * | 3/1981 | Lee et al. | 280/734 |
| 4,474,257 A | * | 10/1984 | Lee | 180/271 |
| 4,518,183 A | * | 5/1985 | Lee | 293/118 |
| 5,145,208 A | * | 9/1992 | Hoagland et al. | 280/734 |
| 5,152,550 A | * | 10/1992 | Hoagland et al. | 280/737 |
| 5,588,672 A | * | 12/1996 | Karlow et al. | 280/730.2 |
| 5,597,179 A | * | 1/1997 | Kornhauser | 280/735 |
| 5,607,180 A | * | 3/1997 | Kornhauser | 180/274 |
| 5,660,414 A | * | 8/1997 | Karlow et al. | 180/274 |
| 5,927,821 A | * | 7/1999 | Bauer et al. | 303/1 |
| 5,975,566 A | * | 11/1999 | Bocker et al. | 280/730.2 |
| 6,000,715 A | * | 12/1999 | Tschaeschke | 280/729 |
| 6,076,852 A | * | 6/2000 | Faigle | 280/735 |
| 6,158,767 A | * | 12/2000 | Sinnhuber | 280/730.2 |
| 6,186,536 B1 | * | 2/2001 | Fischer | 280/728.2 |
| 6,191,686 B1 | * | 2/2001 | Gabriel | 340/435 |
| 6,217,060 B1 | * | 4/2001 | Mangold et al. | 280/730.2 |
| 6,325,410 B1 | * | 12/2001 | Eyrainer | 280/728.3 |
| 6,371,459 B1 | * | 4/2002 | Schick et al. | 267/131 |

FOREIGN PATENT DOCUMENTS

| | | | | |
|---|---|---|---|---|
| WO | WO-9408819 A1 | * | 4/1994 | 280/736 |
| WO | WO 9408819 | * | 4/1994 | B60R/21/26 |

* cited by examiner

Primary Examiner—Avraham Lerner
Assistant Examiner—Paul Royal, Jr.
(74) Attorney, Agent, or Firm—Jeffrey P. Calfa; Neil T. Powell; Dennis Kelly Sullivan

(57) ABSTRACT

An airbag inflation system for a vehicle utilizes a truck's an ambient air compression system including a holding tank for providing compressed air to vehicle systems and an air pump. An outlet is added to the holding tank with a frangible seal closing the outlet until discharge of the air is required to inflate the airbag. An air line connecting the outlet to the airbag is filled upon activation of a squib for breaking the frangible seal upon detection of a rollover related event.

9 Claims, 3 Drawing Sheets

ROLLOVER AIR BAG SYSTEM

BACKGROUND OF THE INVENTION

1. Field of the Invention

The present invention relates to inflation systems for airbags used in vehicle occupant restraint systems, particularly truck occupant protection airbags deployed as a result of rollover of the vehicle.

2. Description of the Prior Art

Airbag inflators commonly employ combustible precursors which, upon combination and reaction, either generate a gas (pyrotechnic devices) to inflate an airbag, or they generate heat used to expand a compressed gas and thereby inflate the airbag. Since the inflation gas is delivered to the airbag under pressure and at a highly elevated temperature relative to ambient conditions, the delivered gas loses heat and declines in temperature rapidly as it expands to fill the airbag. With cooling the inflation gas loses substantial pressure, with the consequence that the volume of airbag which can be inflated is restricted. Chemical inflators must typically be matched to the airbag they are intended to inflate, with each increase in size of bag requiring a larger inflator.

Due the restricted volume of space available on automobiles, and the need to have inflators which operate quickly in cases of collisions, chemical inflators have been favored for automobiles. Due to the great size of the automobile market, the manufacture of chemical airbag inflators enjoys substantial economies of scale, resulting in widespread acceptance of the devices in other applications, such as occupant restraint systems for trucks.

Trucks, however, have resources not generally available on automobiles. These resources include compressed air to operate the trafler brake lines and, in some cases, an air spring suspension. The air system supporting these devices includes air pumps and tanks of substantial volume for holding compressed air for the various vehicle systems.

SUMMARY OF THE INVENTION

It is an object of the invention to provide a system for inflating airbags, particularly on trucks, which are sized and positioned to protect truck occupants in case of rollover of the truck.

It is another object of the invention to provide a system for inflating airbags which is readily applicable to different sizes of airbags.

It is still another object of the invention to employ existing truck resources to support airbag inflation during rollover incidents.

According to the invention there is provided an airbag inflation system includes an air tank for compressed air, preferably a tank already used to support the operation of the truck brake system or suspension system. An outlet from the tank is provided, sealed with a frangible seal. A squib, is positioned with respect to the outlet to open the frangible seal upon actuation. Alternatively to a squib, an electrically actuable valve may be used. An air line connects the outlet to an airbag for inflation of the airbag from the tank. The tank is pressurized by a pump installed on the truck. Air tanks may be used in rollover events because rollover events are slow compared to transmission of the crash pulse during collision events. An advantage of the system is that their is little inflation gas cooling since the tank stores air at ambient temperatures. Larger airbags than are readily supported by chemically based inflators may be used.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood. by reference to the following detailed description of an illustrative embodiment when read in conjunction with the accompanying drawings, wherein:

DETAILED DESCRIPTION OF THE INVENTION

Figure 1:
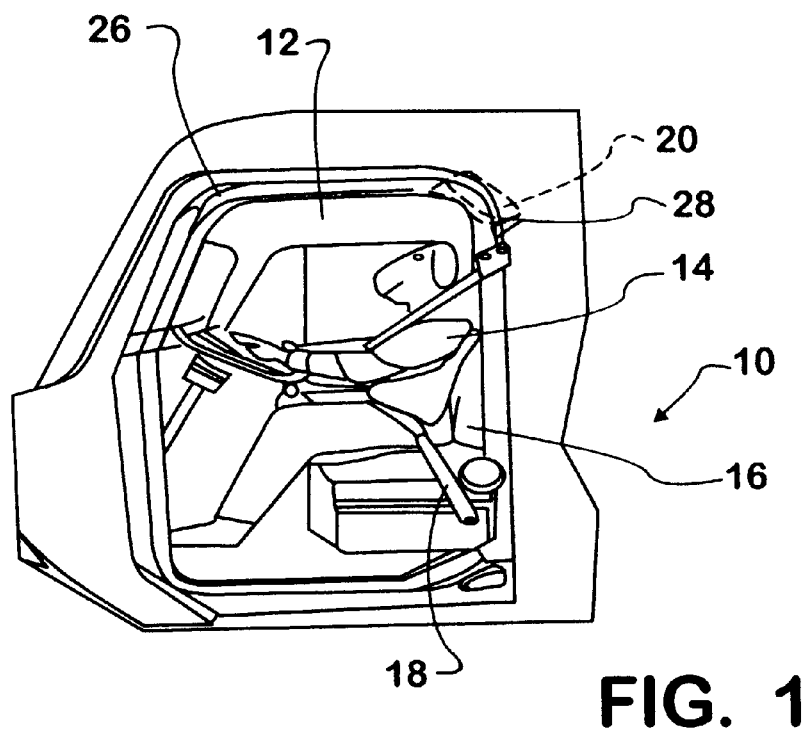
FIG. 1 is a side cutaway view of a truck cab illustrating positioning of a rollover airbag within the cab.

FIG. 1 illustrates a vehicle 10 having a passenger compartment 12. Within the passenger compartment is seated an occupant 14 on a seat 16. The occupant is restrained from unintentionally moving from seat 16 by a safety belt 18 which is worn around the waist and over the shoulder. An undeployed airbag 20 is positioned above, to the left and behind occupant 14, preferably behind a screen or other cosmetic device (not shown). In one embodiment, airbag 20 deploys along a track 26 running along the edge of a door (not shown) into the vehicle passenger compartment 12. Alternatively, airbag 20 may be installed in the roof to deploy downwardly or in other positions not requiring extremely rapid deployment.

Figure 2:
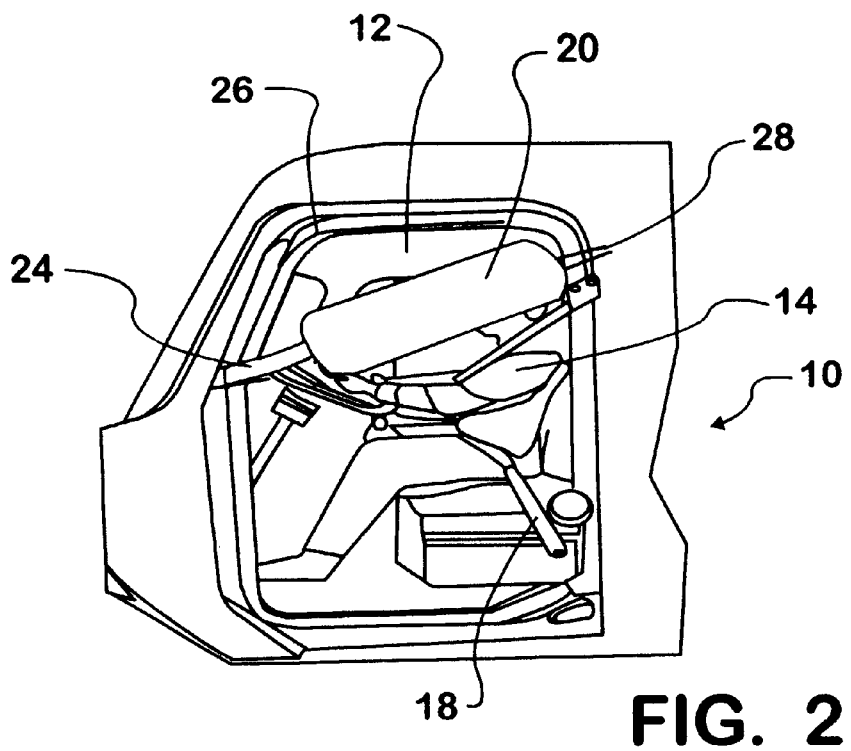
FIG. 2 is a side cutaway view of a truck cab illustrating a deployed rollover airbag.

FIG. 2 illustrates a deployed position of airbag 20 protecting occupant 14 in vehicle passenger compartment 12. As airbag 20 expands with the introduction of compressed air, the cushion expands causing an airbag restraining strap 24 attached to one end of the airbag to track forward and down in track 26 to bring airbag 20 to a position protecting the left side of the face of occupant 14. The second end of airbag 20 held in position at a pivot 28 mounted on the inside wall of passes compartment 12. Airbag 20 is of conventional construction except as to its manner of invention.

Figure 3:
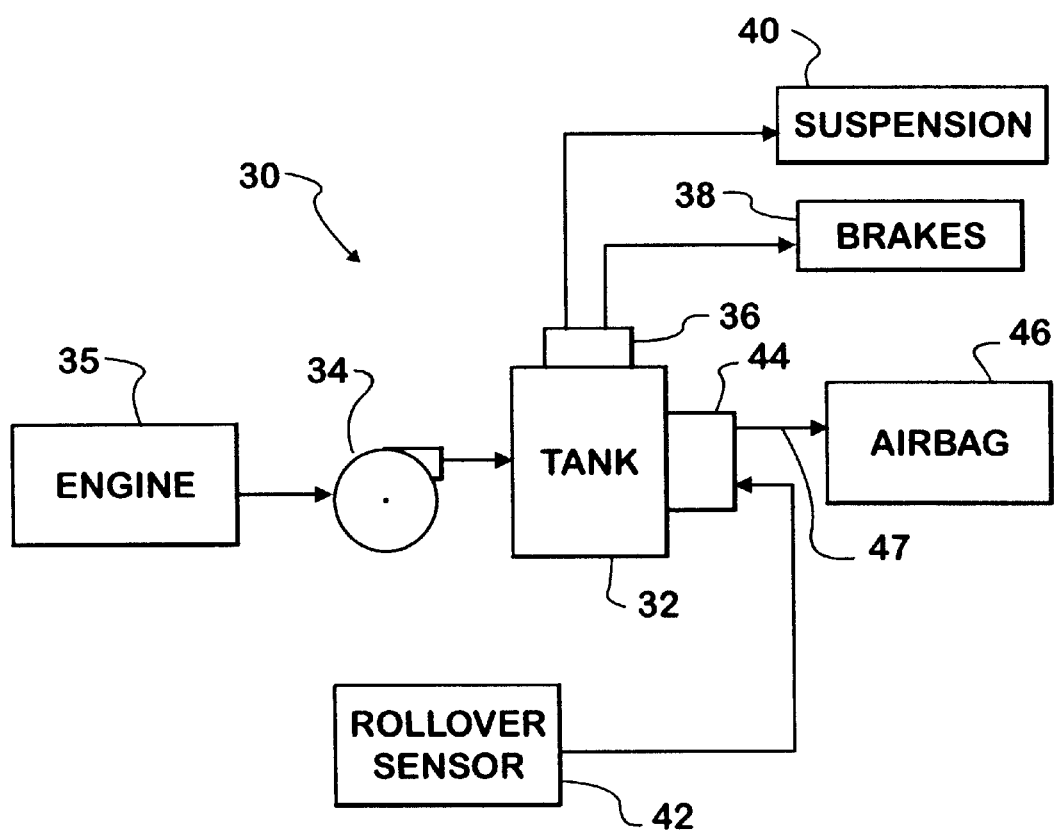
FIG. 3 is a schematic illustration of an airbag deployment system in accord with the present invention.

FIG. 3 is a schematic of an airbag deployment system 30 according to a preferred embodiment of the invention. Airbag deployment system 30 comprises a compressed air tank or reservoir 32, which is pressurized with ambient air from a pump 34 driven by the vehicle prime mover or engine 35. Compressed air tank 32 supplies various vehicle systems, such as the brakes 38 or suspension 40 with compressed air through a valve control arrangement 36.

A conventional rollover sensor 42 determines when, and in some embodiments how quickly, air is to be released from tank 32 to airbag 46 through air line 47. An airbag inflation signal is, responsive to sensor conditions indicative of a rollover event, supplied to an inflation controller 44, which may be a squib or a electrically controlled valve responsive to signal level.

Figure 4:
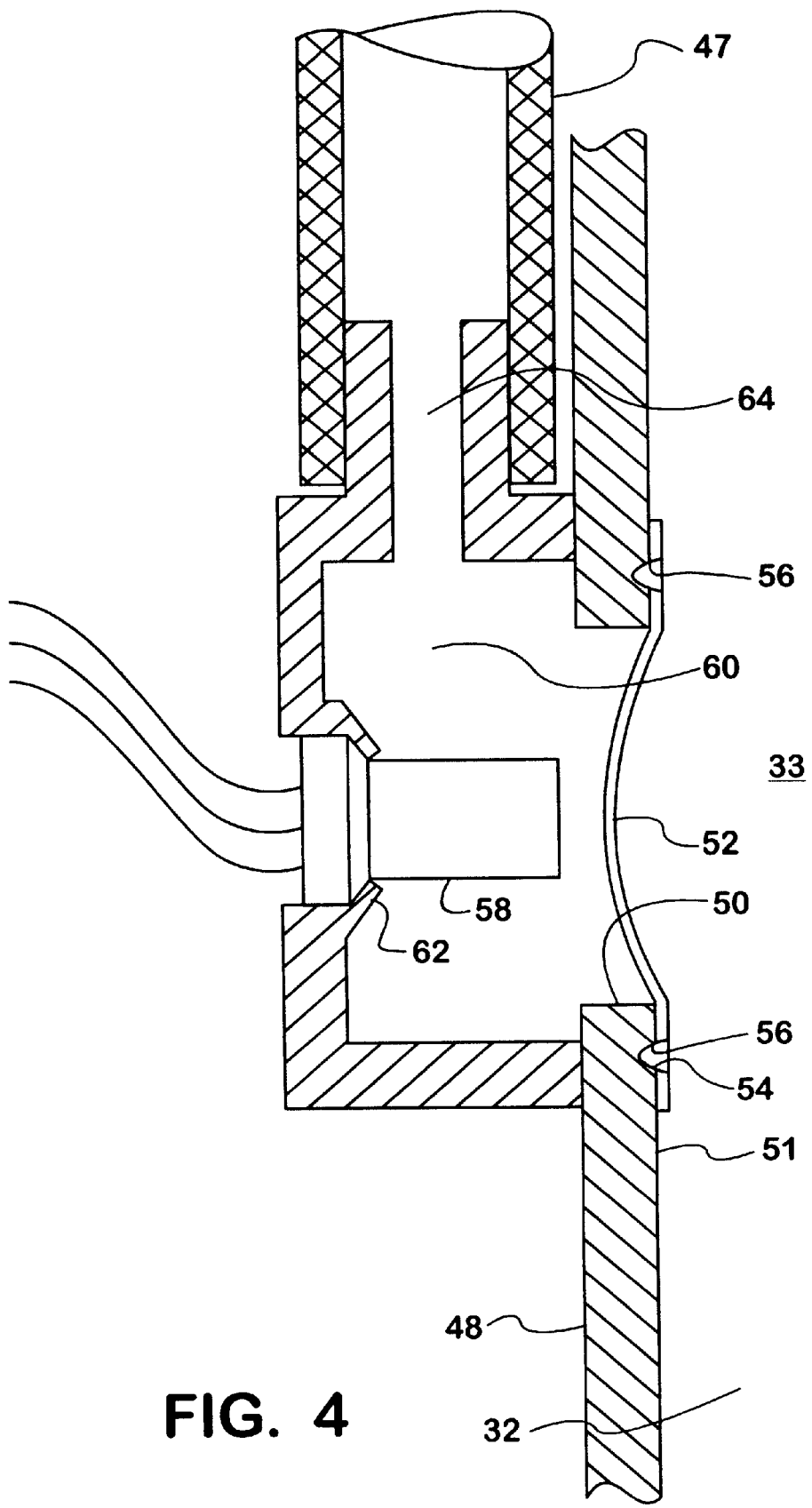
FIG. 4 is a cross-sectional view of a squib actuation system.

FIG. 4 depicts a preferred squib 58 arrangement for initiating inflation of one or more airbags. Where control of the rate of airflow from compressed air tank 32 is not considered important, a squib 58 may be used to puncture a frangible seal 52 used to close an outlet from the interior 33 of compressed air tank 32. Frangible seal 52 is attached by spot welds 56 to an interior wall 51 of tank 32 along exterior seal flanges 54. An electrically actuated squib 58 is positioned by a retainer 62 in a plenum 60 opposite frangible seal 52. Upon actuation, squib 58 explodes into seal 52 tearing the seal open and allowing compressed air into plenum 60 and from plenum 60 through a vent 64 into air line 47. Air line 47 carries the airstream to an airbag connected to the opposite end of the air line.

The invention provides an inflation system for airbags, particularly on trucks, which allows the easy use of airbags sized and positioned to protect truck occupants in case of rollover of the truck. The invention provides a system for inflating airbags which is readily applicable to different sizes of airbags without changing the configuration of the airbag inflation system and makes use of existing air pressure systems on the truck.

While the invention is shown in only one of its forms, it is not thus limited but is susceptible to various changes and modifications without departing from the spirit and scope of the invention.

What is claimed is:

1. An airbag inflation system for protecting a vehicle occupant positioned in a passenger compartment of a vehicle, comprising:
   an ambient air compression system including a holding and storage tank for providing compressed air to a plurality of vehicle systems;
   vehicle interior sides defining the passenger compartment;
   a passenger seat situated along one vehicle interior side in the passenger compartment;
   a track positioned on the vehicle interior side adjacent the passenger seat;
   an airbag mounted to deploy along the track between the vehicle occupant seated on the passenger seat and the vehicle interior side;
   a pump for compressing ambient air;
   the general purpose air storage tank connected to the pump to receive compressed air from the pump;
   an air line connected between the tank and the airbag;
   means for releasing compressed air from the tank to the air line; and
   means responsive to a vehicle rollover event for actuating the means for releasing.

2. The airbag inflation system of claim 1, and flirter comprising:
   a vehicle brake system actuable by compressed air; and
   a valve for discharging compressed air from the tank to the vehicle brake system.

3. The airbag inflation system of claim 2, wherein the means for releasing includes:
   an opening to the tank;
   a frangible seat closing the opening; and
   a squib responsive to the means for actuating disposed to open the frangible seal.

4. The airbag inflation system of claim 2, wherein the means for releasing includes a valve responsive to the means for actuating.

5. An airbag inflation system for a passenger compartment defined within interior sides of a vehicle, the airbag inflation system comprising:
   a plurality of compressed air actuated systems including a brake system;
   an ambient air compression system including a holding tank for providing compressed air to the plurality of vehicle systems;
   an outlet from the holding tank;
   a frangible seal closing the outlet;
   a track running along at least one interior side of the passenger compartment;
   an airbag partly mounted in the track to expand upon inflation along the track;
   an air line connecting the outlet to the airbag; and
   a squib for breaking the frangible seal.

6. An airbag inflation system as set forth in claim 5, and further comprising:
   means responsive to vehicle rollover conditions for actuating the squib.

7. An airbag inflation system as set forth in claim 6, wherein the ambient air compression system further includes a pump for delivering air to the holding tank through an inlet to the holding tank.

8. An airbag inflation system as set forth in claim 7, and further comprising a plurality of air driven vehicle vocations coupled to the holding tank.

9. An vehicle comprising:
   a plurality of differentiated compressed air actuable systems;
   an air compression system;
   a compressed air reservoir fed by the air compression system and connected to actuate the plurality of differentiated compressed air actuable systems;
   a passenger compartment defined by interior sides of the vehicle;
   a track along at least one interior side;
   an inflatable airbag mounted with respect to the track to expand along the track upon inflation;
   a rollover detector responsive to a vehicle rollover event for generating an airbag inflation signal;
   an outlet from the compressed air reservoir;
   an air line connecting the outlet to the airbag;
   a frangible seal closing the outlet; and
   a squib responsive to the airbag inflation signal for breaking the frangible seal.

* * * * *